United States Patent [19]
Lucienne

[11] Patent Number: 5,601,002
[45] Date of Patent: Feb. 11, 1997

[54] DAMPED FLYWHEEL, ESPECIALLY FOR A MOTOR VEHICLE

[75] Inventor: Philippe Lucienne, Aumont, France

[73] Assignee: VALEO, Paris, France

[21] Appl. No.: 251,298

[22] Filed: May 31, 1994

[30] Foreign Application Priority Data

Jun. 2, 1993 [FR] France ................................ 93 06583

[51] Int. Cl.⁶ .............................. F16F 15/10; G05G 1/00
[52] U.S. Cl. .................................................. 74/574; 74/572
[58] Field of Search ...................... 74/572–574; 51/295

[56] References Cited

U.S. PATENT DOCUMENTS

| | | | |
|---|---|---|---|
| 4,076,340 | 2/1978 | Meinke et al. | 308/10 |
| 4,220,455 | 9/1980 | St. Pierre et al. | 51/295 |
| 4,247,304 | 1/1981 | Morelock | 51/295 |
| 4,262,840 | 4/1981 | Gronert et al. | 74/572 X |
| 4,353,953 | 10/1982 | Morelock | 428/213 |
| 4,381,271 | 4/1983 | Hayden | 264/29.5 |
| 4,606,738 | 8/1986 | Hayden | 51/295 |
| 4,729,465 | 3/1988 | Reik | 192/106.2 |
| 5,029,686 | 7/1991 | Yesnik | 192/70.14 |
| 5,307,710 | 5/1994 | Feldhaus et al. | 74/574 |

FOREIGN PATENT DOCUMENTS

| | | |
|---|---|---|
| 0395198 | 10/1990 | European Pat. Off. . |
| 0476707 | 3/1992 | European Pat. Off. . |
| 2554891 | 5/1985 | France . |
| 2576357 | 7/1986 | France . |
| 2675517 | 10/1992 | France . |
| 9204349 | 12/1992 | Germany . |
| 8420404 | 1/1993 | Germany . |
| 8332343 | 2/1993 | Germany . |

*Primary Examiner*—Vinh T. Luong
*Attorney, Agent, or Firm*—Longacre & White

[57] ABSTRACT

A damped flywheel, in particular for a motor vehicle in conjunction with the clutch of the vehicle, comprises two coaxial masses which are mounted for rotational displacement of one with respect to the other. One of the masses includes a centring nose which projects axially and penetrates into a central opening of the other mass. An amorphous diamond carbon coating is provided between the centring nose and the central opening, so that one of the rotating masses is mounted on the other through this coating.

12 Claims, 3 Drawing Sheets

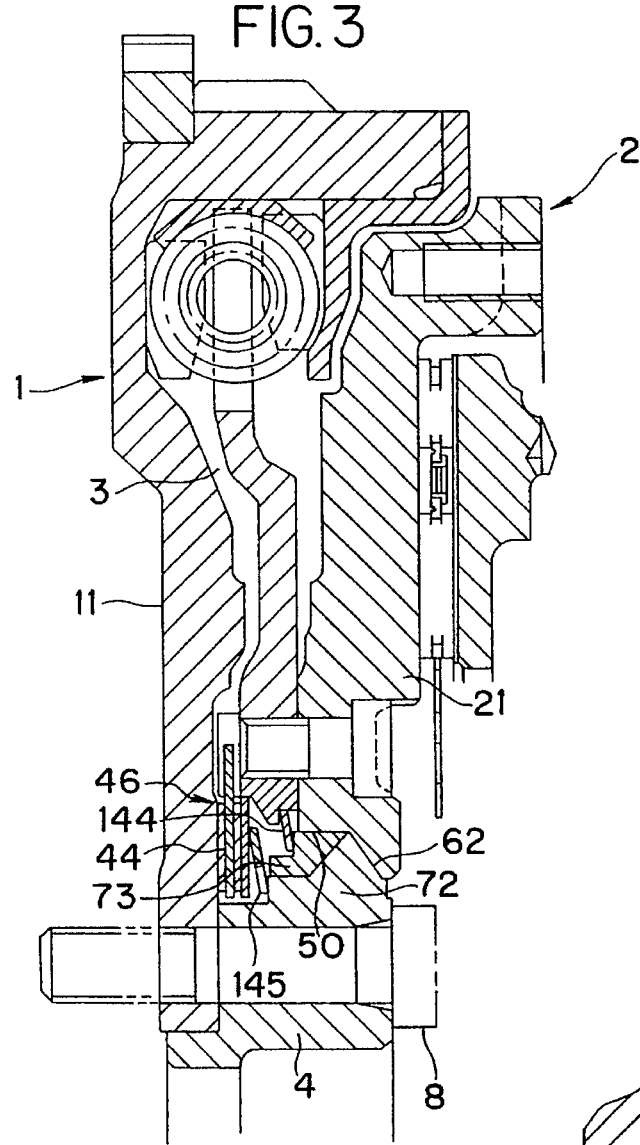
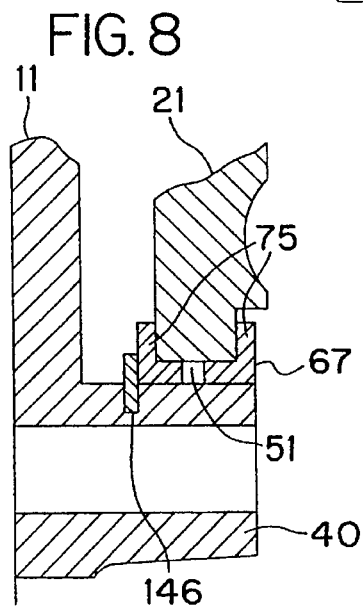
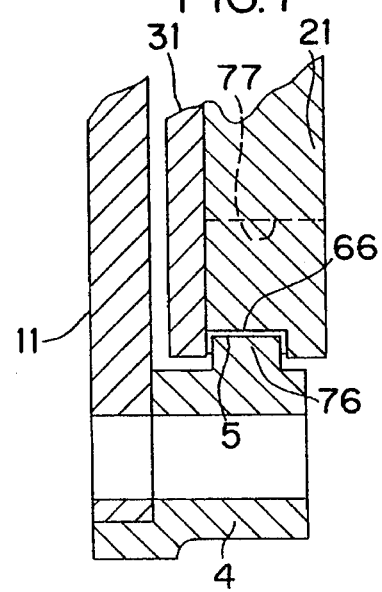

DAMPED FLYWHEEL, ESPECIALLY FOR A MOTOR VEHICLE

FIELD OF THE INVENTION

The present invention relates to damped flywheels, especially for a motor vehicle, of the kind generally comprising two coaxial masses mounted for rotational displacement of one with respect to the other against the action of a torsion damping device, with one of the masses comprising a centring nose which projects axially and which penetrates into a central opening of the other mass, with support means being operatively interposed between the said nose and the said opening for the rotational mounting of the mass having the central opening.

BACKGROUND OF THE INVENTION

A damped flywheel of this type is described in French published patent specifications FR 2 554 891A and FR 2 576 357A.

The support means usually consist of a rolling bearing such as a ball bearing, which substantially increases the selling price of the damped flywheel. This cost is particularly high due to the fact that this bearing has to be able to withstand temperatures of the order of 200° C. In this connection, in a motor vehicle, one of the two coaxial masses in the flywheel comprises a plate which acts as the reaction plate of a clutch, and which can reach considerably temperatures during heavy use. In addition, the bearing is usually lubricated in such a way that the grease which it contains can tend to escape, thus contaminating the reaction plate and/or the friction device which is usually incorporated as part of the torsion damping device. All of this impairs both the performance and the useful life of the damped flywheel. A further disadvantage is that the bearing is liable to seize up.

In order to overcome the above mentioned drawbacks, it may be thought possible to use smooth bearings as described in the above mentioned patent specifications. However, other problems also arise in a damped flywheel, and in particular problems connected with the lubrication of smooth bearings, as well as those of resistance to abrasion (due to the oscillating motions of the damped flywheel), and problems of the temperature and thickness of the bearing.

In addition, corrosion problems can occur, especially when the vehicle is immobilised for a long time. All of this has led to the fact that smooth bearings have not so far found any favour for use in damped flywheels.

In addition to the foregoing, it is desirable that the support means should have a coefficient of friction as small as possible.

DISCUSSION OF THE INVENTION

An object of the present invention is to overcome the above mentioned drawbacks, by providing a novel damped flywheel which has no rolling bearing, and which has support means which have a high resistance both to abrasion and to high temperature, but with a low coefficient of friction and high corrosion resistance.

According to the invention, a damped flywheel, especially for a motor vehicle, of the kind generally comprising two coaxial masses mounted for rotational displacement of one with respect to the other against the action of a torsion damping device, with one of the masses comprising a central centring nose which projects axially and which penetrates into a central opening of the other mass, with support means being operatively interposed between the said nose and the said opening for the rotational mounting of the mass having the central opening, is characterised in that the support means comprise an amorphous diamond carbon coating, for mounting the mass having the central opening rotatably on the mass having the central nose.

A coating of the above mentioned type is also referred to in the literature as synthetic, or pseudo, diamond carbon. This coating is substantially amorphous, and contains carbon with a small proportion of hydrogen. For more details about this, reference is invited to the French and European published patent specifications FR 2 675 517A and EP 0 395 198A, describing a process in which a carbonated gas is introduced by means of blowers into a chamber which has been previously evacuated by means of a pump. After the gas has been introduced, an electric discharge is effected in the chamber using a high frequency generator which causes the carbonated gas to become ionised, so that the atoms undergo partial loss of their electrons so as to form a plasma. The metallic support member, contained in the above mentioned chamber and supporting the component which is to be coated, becomes negatively charged so as to attract the positive ions present in the plasma. This causes the coating of amorphous diamond carbon to be formed.

Thanks to the invention, the coating offers exceptional properties to the damped flywheel, very close to those of synthetic diamond.

Thus, the flywheel has support means which are highly abrasion resistant, and which have a low coefficient of friction which in practice is smaller than that of a polytetrafluorethylene coating of the kind which is marketed for example under the Trade Mark TEFLON or $MoS_2$ (molybdenum bisulphide), and a thermal conductivity which is greater than that of copper, being also highly corrosion resistant.

In addition this coating is stable at the temperatures which the damped flywheel may attain in use. Furthermore its thickness is very low, being of the order of 2 to 3 microns, so that there is little interference on the sides of the treated components. This low thickness enables the above mentioned reaction plate of the clutch to be increased in length so as to improve the rate of evacuation of heat.

A further advantage is that the invention need not call for the use of non-standard components for the central nose and the reaction plate of the damped flywheel. To this end, it is enough to make use of at least one plain bearing ring which replaces the usual bearing. Preferably, the central nose is a separate component, carried on the rotatable mass concerned; it can then be easily coated before being secured to the rotatable mass. This then reduces the total size of the components to be treated.

In general terms, the coating is inexpensive and leads to a significant reduction in the selling price of the damped flywheel, while at the same time increasing the useful life and reliability of the latter. Since the coating is of the dry type, there is no longer any danger of contamination of the reaction plate and/or of the friction means of the torsion damping device.

Of course, as is described in French published patent specification FR 2 675 517A, the coating may be obtained by plasma-assisted chemical vapour condensation as described above, using carbonated gases which for example contain one or more hydrocarbons, for example methane, acetylene, propane or butane, to which are added silicic and/or nitrogen-boron compounds. The silicon gives flexibility and adhesion, while the nitrogen and boron give thermal stability with an increase in hardness.

It will be appreciated that the coating applied in accordance with the invention adheres perfectly to the component concerned, and that it suffers practically no scaling effect. In addition, the coating is an excellent electrical insulator.

Some preferred embodiments of the invention will be described below, by way of example only and with reference to the accompanying drawings.

BRIEF DESCRIPTION OF THE DRAWINGS

FIG. 3 is a view similar to FIG. 1, but showing a second embodiment of the invention.

FIGS. 4 to 8 are simplified views, each showing the central portion of the damped flywheel in a respective further embodiment of the invention.

DESCRIPTION OF PREFERRED EMBODIMENTS OF THE INVENTION

Figure 1:
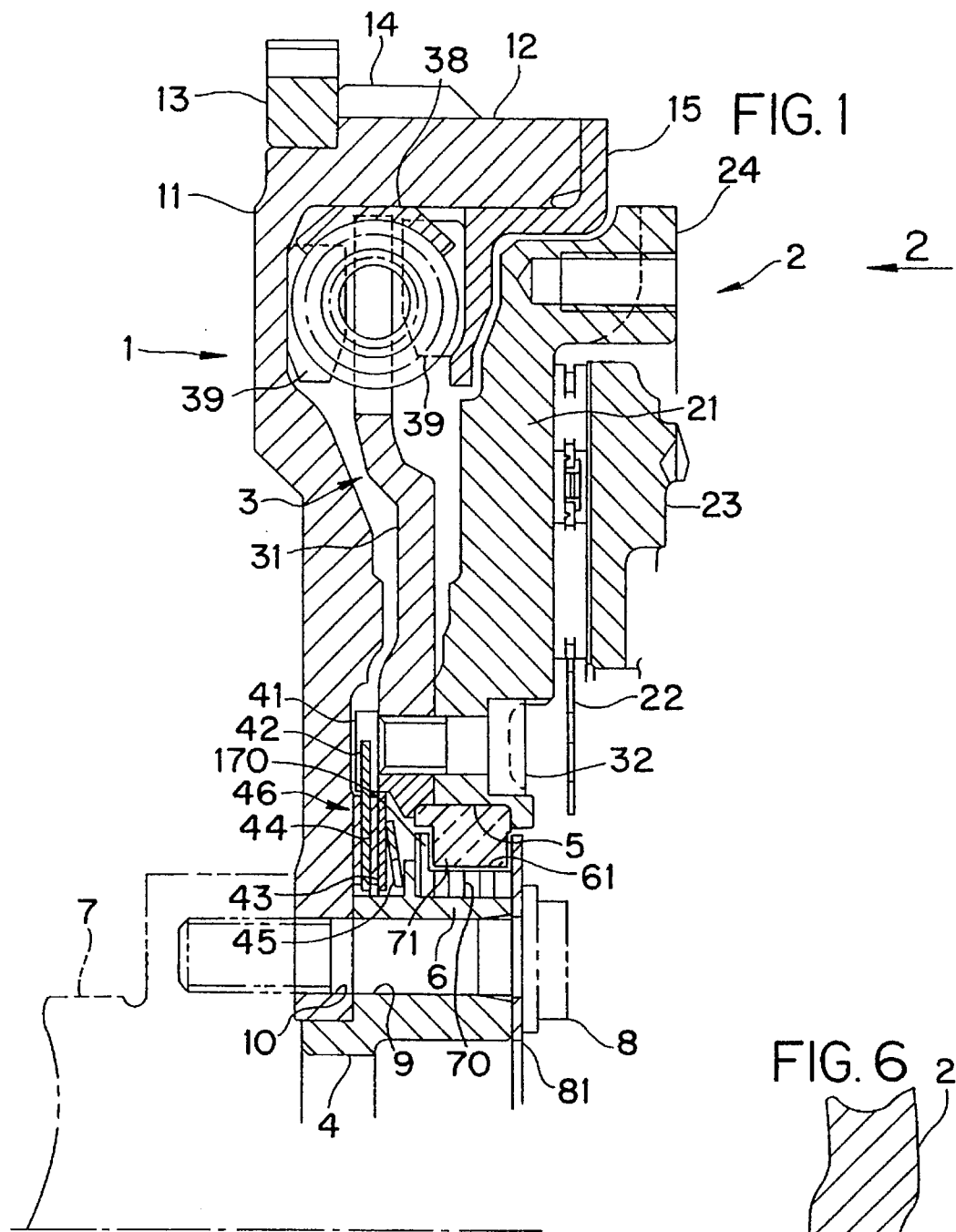
FIG. 1 is a half view in axial cross section of a damped flywheel in accordance with the invention.

The drawings show a damped flywheel, of the kind normally referred to as a double damped flywheel, for a motor vehicle. It is of the general kind comprising two coaxial masses 1 and 2, which are mounted for rotational displacement with respect to each other against the action of a torsion damping device 3. One of these masses carries a central, centring nose projecting axially and penetrating into a central opening 5 of the other mass. Support means 6 are arranged between the nose 4 and the opening 5 so as to mount the mass having the central opening 5 for rotation.

In a known manner, the damped flywheel enables vibrations which arise along the length of the drive train constituted by a transmission to be damped out. In a motor vehicle, this drive train is that which extends from the internal combustion engine of the vehicle to the driving axles of its road wheels.

More precisely, in this example the first mass 1, or input mass, is arranged to be mounted on the crankshaft 7 of the engine for rotation with it, while the second mass 2, or output mass, is arranged to be mounted on the input shaft of the gearbox for rotation with that shaft. In the present example it is the first mass 1 that has the central nose 4, while the second mass 2 has the central opening 5. The mass 1 is secured to the crankshaft 7 by means of a plurality of studs 8, each of which extends through holes 9 and 10 which are formed in alignment with each other, respectively in the nose 4 and in a transverse plate member 11. As can be seen in FIG. 1, the nose 4 centres the plate member 11, and the studs 8 secure the plate member 11 and nose 4 together.

Figure 2:
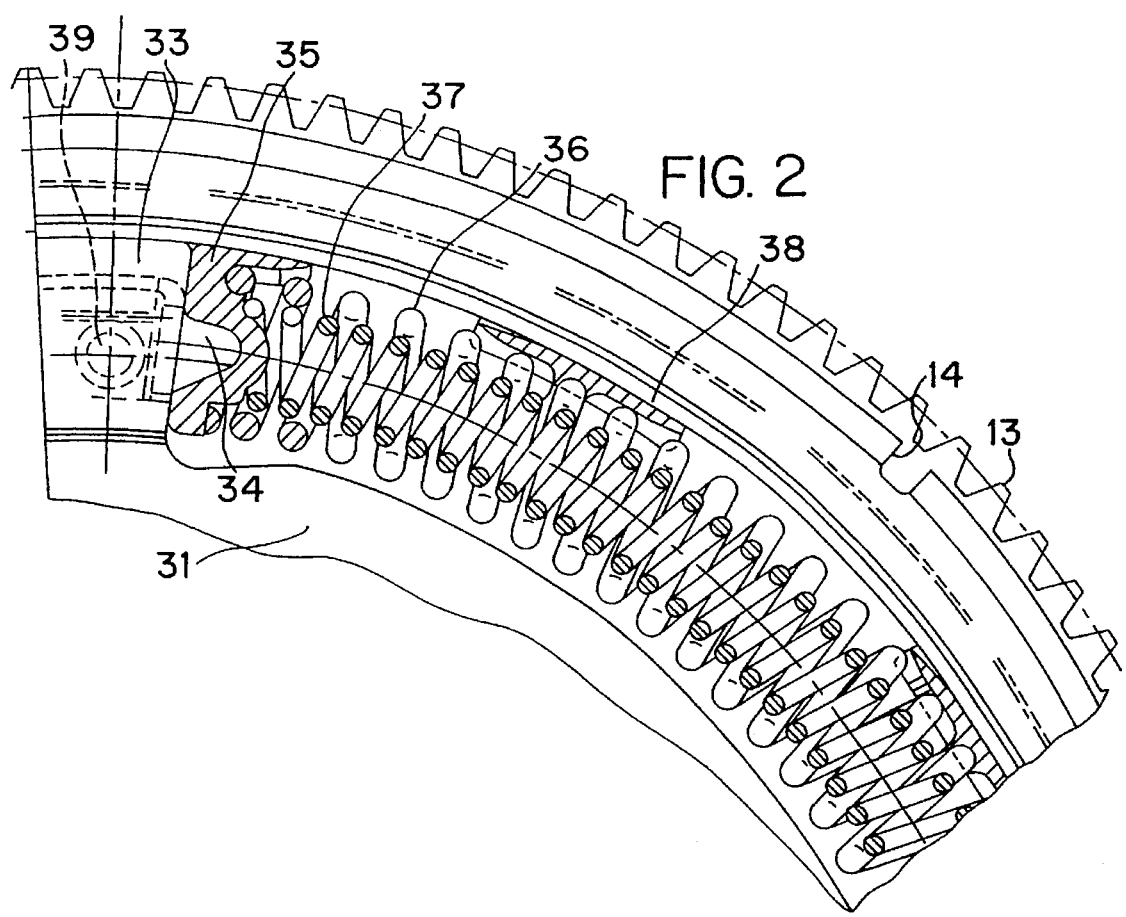
FIG. 2 is a partial view as seen in the direction of the arrow 2 in FIG. 1, with the second mass and the metal plate member that covers the springs being omitted.

The plate member 11 carries at its outer periphery an axially oriented spacing crown 12, which in this example is integral with the plate member 11. It will of course be understood that the crown 12 may be a separate component carried on the plate member 11 and secured to it, for example by riveting or otherwise. The crown 12 carries a starter crown 13 which is arranged to be driven by the starter of the vehicle. The crown 12 also has ignition timing marks 14 in the form of recesses (FIG. 2) or bosses (not shown).

A metal plate member, 15, of sinuous cross section, hugs the profile of the spacer crown 12, and is fitted at the free end of the latter. The plate member 15 is secured by welding to the spacer crown 12, and has at its inner periphery a portion in the form of a transverse plate element extending towards the axis of the assembly.

The second mass 2 includes a plate 21 which constitutes the reaction plate of a conventional friction clutch. The friction disc of this clutch, which is partly visible at 22, is provided with friction liners in the usual way, while the pressure plate of the clutch is indicated at 23. The clutch has a cover plate (not shown) which is secured on the peripheral flange 24 of the reaction plate 21. A diaphragm, which is again not shown, is interposed between the cover plate and the pressure plate 23. For greater detail reference is invited to FIG. 1 of French published patent specification No. FR 2 554 891A and the corresponding U.S. Pat. No. 4,729,465, given that the clutch is of the type which is normally engaged, with the friction disc 22 being gripped by the action of the diaphragm between the pressure plate 23 and reaction plate 21.

The friction disc 22 has at its inner periphery a hub (not shown), which is mounted on the input shaft of the gearbox for rotation with it, so that the second mass 2 is thus mounted in rotation on the input shaft of the gearbox through the friction clutch. The reaction plate 21 has at its inner periphery a bore which constitutes the above mentioned central opening 5.

A damper plate 31 is carried on the reaction plate 21 at the inner periphery of the latter, which lies radially inwards of the friction liners carried by the friction disc 22. The damper plate 31 is secured to the reaction plate 21 by means of studs 32. The damper plate 31 has at its outer periphery a plurality of projecting radial arms 33, one of which can be seen in FIG. 2. Each arm 33 has circumferential fingers 34, each of which penetrates into a hollow of a thrust insert cup 35 (see FIG. 2). A pair of concentric coil springs 36, 37 is arranged between each arm 33 and the next consecutive arm 33, with thrust insert cups 35 being interposed between the circumferential ends of these springs 36, 37 and the arms 33. The arms 33 penetrate into the cavity which is defined by the plate member 15, the spacer crown 12, and the plate member 11.

The plate member 11 and the plate member 15 carry pads 39, which are riveted respectively to the plate members 11 and 15 and which are in facing relationship with the arms 33, for engagement with the circumferentially acting springs 36 and 37 via the thrust insert cups 35. In this way, the springs 36 and 37 are able to be kept greased, by grease which is contained in the above mentioned cavity. It will of course be understood that in place of the pads, the plate member 15 and the plate member 11 may be formed with pressed-out elements for engagement with the springs 36 and 37. It will be noted that the outer springs, 36, carry shoes 38 which are fitted on one turn of the spring 36 so that these shoes can rub in frictional engagement against the inner periphery of the spacer crown 12.

The components 31, 33, 35, 36, 37, 38 and 39 are part of the torsion damping device 3, mentioned above and interposed mechanically between the two masses 1 and 2. Thus, and in the known way, during the relative angular displacement that takes place between the two masses 1 and 2, the springs 36 and 37 become compressed. The torsion damping device 3 also includes a friction means 46 which is arranged at the outer periphery of the nose 4, which in this example is of metal and is of tubular form.

The friction means 46 comprises a friction ring 42 which is arranged to mesh with rivets 41 secured to the damper plate 31, together with an application ring 43 which is mounted on the nose 4 for rotation with the latter, and an axially acting resilient ring 44 which in this example is a Belleville ring. The Belleville ring 44 bears on the application ring 43 and on a shoulder 45 which is fixed with respect to the nose 4. In this example the shoulder 45 is formed integrally on the nose 4. Thus the friction ring 42 is gripped between the application ring 43 and the plate member 11 under the action of the resilient ring 44, and friction occurs in the known way during the relative rotational displacement which takes place between the two masses 1 and 2, with the friction ring 42 being displaced by the rivets 41 with respect to the plate member 11 and application ring 43, which is located on the nose 4 by means of lugs which are engaged in grooves formed in the nose 4.

In use, the reaction plate 21, which is commonly of cast form, becomes heated. In this connection, each time the clutch is engaged, the friction liners of the friction disc 22 make frictional engagement on the reaction plate 21, which is thus heated to temperatures of the order of 200° C. in the region of the support means 6. For this purpose, and in order to eliminate the ball bearing which is conventionally arranged between the two coaxial masses 1, 2 of the damped flywheel, and in order to reduce the cost of the damped flywheel, the support means 6 comprise a coating of amorphous diamond carbon, for mounting the mass 2 that has the central opening 5 rotatably on the mass 1 that has the central nose 4. This coating, in the form of a carbon layer, is easy to apply and in certain cases it enables the number of components of a conventional damper to be maximised in an arrangement according to the invention. Thus in FIGS. 1 and 2, the reaction plate 21 and the tubular nose 4 are standard components.

In FIG. 1, the conventional bearing is replaced by two coaxial plain bearing rings 70 and 71, with the amorphous diamond carbon coating 61 interposed at their interface. This avoids any contamination of the reaction plate 21 and/or of the friction means 46, because the coating 61 is of the dry type.

The central opening 5 in the reaction plate 21 is cylindrical: accordingly, the inner ring 70 is force-fitted on to the cylindrical outer periphery of the nose 4, being located axially by the shoulder 45 mentioned above, and by a thrust ring 81 which is interposed between the free end of the nose 4 and the heads of the studs 8. The thrust ring 81 acts as a thrust ring, or common washer, for the studs 8.

The outer ring 71 is force-fitted into the cylindrical and shouldered internal bore 5 of the reaction plate 21, and is located axially by the shoulder which is defined by the reaction plate 21 at its inner periphery on the opposite side from the damper plate 31, and by a shoulder of the damper plate 31 itself. Thus the two bearing rings 70 and 71 are secured to the nose 4 and to the reaction plate 21 respectively. In the present example, these rings 70 and 71 are of wear-resistant, surface hardened steel.

At that one of its ends which is adjacent to the shoulder 45, the inner bearing ring 70 is formed with a collar 170, while the outer ring 71 has a recess for receiving this collar. Thus the inner ring 70 has a generally L-shaped cross section, and the coating 61 is applied on the less bulky bearing ring 70: more precisely, it is applied locally on the outer periphery of this ring. That face of the collar of the inner ring 70 which faces towards the thrust ring 81 is also coated, as is that face of the thrust ring 81 which faces towards the inner ring 70.

Thus the coating 61, which is generally annular, has a U-shaped cross section, with a low thickness of the order of 2 to 3 microns, as will be described later on herein.

It will be seen that only the components 70 and 81 are treated with this coating, so that the coating itself is quite inexpensive. It will also be appreciated that the low thickness of the coating enables the bearing rings 70 and 71 to be made to the required thickness.

Referring now to FIG. 3, in this embodiment the nose 4 has at its outer periphery, in facing relationship to the central opening 50 of the reaction plate 21 and in the vicinity of its free end, an integral, annular, radially projecting rib 72 of pointed shape, having two inclined faces defining a V in cross section. The central opening 50 of the reaction plate 21 has a cylindrical portion followed by an inclined portion which defines an inclined face at the inner periphery of the reaction plate 21. The cylindrical portion is arranged for centring a shouldered cylindrical bearing ring 73 which is interposed radially between the outer periphery of the nose 4 and the inner periphery of the bore 50.

An axially acting resilient ring 144, which is here a Belleville ring, bears on the shoulder of the ring 73 and on a shoulder of the damper plate 31 which is defined in a recess formed at the inner periphery of the damper plate 31, in facing relationship to the reaction plate 21. The Belleville ring 144 biasses the shouldered ring 73 towards the projecting rib 72. The ring 73, which in this example is of surface hardened steel, has an inclined face in facing relationship to the projecting rib 72. As will be understood, the inclined fces of the ring 73 and reaction plate 21 define between them an annular recess which receives, in a complementary manner, the annular projecting rib 72. The Belleville ring 144 ensures that the shouldered ring 73 is abutted against the projecting rib 72 so as to take up any clearances.

In FIG. 3 the amorphous diamond carbon coating is indicated at 62, and is formed locally on the nose 4, on the outer surface of the projecting rib 72, and also on its cylindrical portion which extends from the rib 72 towards the plate member 11. This cylindrical portion of the nose is terminated by a shoulder 145 which defines a changing diameter of the nose, and it is on this shoulder that the Belleville ring 44 of the friction means 46 bears.

It will be noted that the above-mentioned cylindrical portion of the nose acts as a centring means for the shouldered bearing ring 73 that surrounds it, and that only the nose 4 is surface hardened. The fact that the nose 4 is not integral with the plate member 11 is thus of particular advantage.

Figure 4:
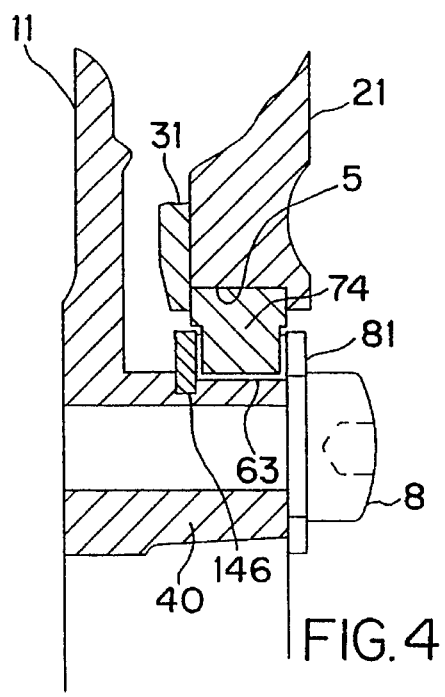

The number of bearing rings, such as the rings 70 and 71 in FIG. 1, can of course be reduced. Thus, referring to FIG. 4, there is only one bearing ring, 74, which is force-fitted into the cylindrical central opening 5, being located axially in the same way as in FIG. 1. In FIG. 4, the nose, 40, is integral with the metallic plate member 11, and a circlip 14 in a groove replaces the shoulder 45 of FIG. 1.

The bearing ring 74 is thus secured to the reaction plate 21, and the amorphous diamond carbon coating 63 is applied on the inner periphery of the ring 74 and on part of each of its side faces. The coating 63 therefore here has a U-shaped cross section. The ring 74, which in this example is of treated steel, is therefore the component which is provided with the carbon layer.

Figure 5:
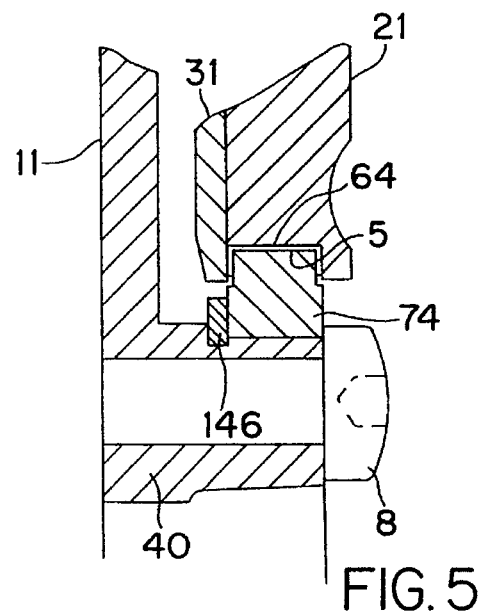

It is of course possible to reverse the arrangement, and this is illustrated in FIG. 5. In FIG. 5, the ring 74 is force-fitted on to the nose 40, being located axially by the circlip 146 and by the heads of the studs 8, with which in this case the ring 74 is in direct contact. In FIG. 5, the amorphous carbon coating 64 of U-shaped cross section is applied on the outer periphery of the ring 74, and again over part of its side faces.

Thus the sliding action occurs on the nose 40 in FIG. 4 and on the ball 5 in FIG. 5.

It is of course possible to reverse the components that carry the coating. Thus, the ring 74 may not be coated at all, with the coating being applied instead either on the inner periphery of the reaction plate 21 and damper plate 31, or on the outer periphery of the nose 40 and on the circlip 146 and the heads of the studs 8.

Figure 6:
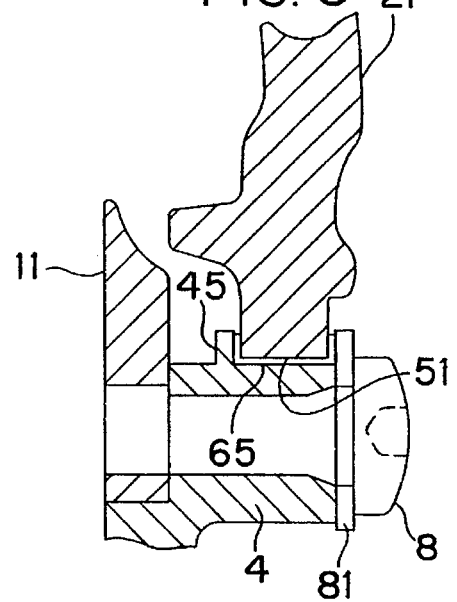

Reference is now made to FIG. 6. In this embodiment, the amorphous diamond carbon coating, 65, works directly between the nose 4 and the central cylindrical opening 51 of the reaction plate 21. The coating is preferably carried by the nose 4 and by the adjacent faces of the shoulder 45 and thrust ring 81. This U-shaped coating may of course be applied on the reaction plate 21 itself. Either way, the arrangement shown in FIG. 6 is of particular advantage. In this connection, since the coating 65 has a low thickness of the order of 2 to 3 microns, then for a given size of the nose 4, the reaction plate 21 can be extended radially inwardly. Thus, by contrast with the embodiment shown in FIG. 1, the reaction plate 21 is extended in radial depth by an amount corresponding to the thickness of the bearing rings 70 and 71.

Thus, in operation, the bore 51 is kept cooler than the bore 5 in FIG. 5, heat evacuation being improved due to the increase in the radial depth of the reaction plate 21. It will also be appreciated that the inner periphery of the reaction plate 21 is simplified. In a further modification, having regard to the increase in the radial length of the reaction plate 21, it is possible to form circular through holes 77 (see FIG. 7) in the inner periphery of the reaction plate 21 and damper plate 31, so as to improve the ventilation of the reaction plate.

The nose 4 may of course be provided with a radially projecting integral crown 76 (see FIG. 7) which replaces the bearing ring 74 of FIG. 5.

Similarly, in FIG. 8, to which reference is now made, the inner periphery 51 of the reaction plate 21 is simplified, with two bearing rings 75 having an L-shaped cross section being interposed between the nose 40 and the reaction plate 21. These rings 75 act as spacers between the reaction plate 21 and the nose 40, and provide axial location for the reaction plate 21. One of these rings is located axially by the circlip 146, while the other is located by the thrust ring 81 (shown in FIG. 6 but not in FIG. 8).

The present invention is of course not limited to the embodiments described above and shown in the drawings. In particular, as described in the above mentioned French patent specification FR 2 554 891A and U.S. Pat. No. 4,729,465 in FIG. 1, the nose may be fixed to the reaction plate 21 of the second mass 2, and the central opening may be defined by the inner periphery of the plate member 11, which is preferably thickened for this purpose.

In every case, the amorphous diamond carbon coating is easily obtained. In this connection, a hard layer of amorphous diamond carbon based material is deposited by the process known as "CVD assisted plasma" on a component of the flywheel, for example the bearing ring 70 and thrust ring 81 of FIG. 1, the projecting rib 72 of the nose 4 in FIG. 3, the bearing ring 74 in FIGS. 4 and 5, the nose 4 in FIG. 6, the projection 76 in FIG. 7, and the bearing rings 67 in FIG. 8.

The CVD assisted plasma process comprises introducing a carbonated gas, containing in particular one or more hydrocarbons, into a vacuum chamber which contains a metallic support member connected to a high frequency generator, and on which the metallic component to be coated is arranged. An electric discharge is effected within the chamber, in such a way as to raise the temperature of the component to a value of the order of 200° C., and under conditions of power and pressure which enable the physical and chemical excitation of the gas, and its ionisation, to take place in such a way as to cause a hard layer of low thickness (2 to 3 microns) of amorphous diamond carbon-based, or synthetic diamond carbon-based material, to be deposited on the negatively charged component.

If desired, the thickness of the layer may of course be made greater than 3 microns.

Preferably, silicic compounds are added to the carbonated gas, and in particular silane and/or tetramethylsilane, together with components which contain one atom of carbon, boron, or fluorocarbon.

Nitrogen and boron provide thermal stability and hardness, and a thin layer of particularly hard and dense material is deposited.

The unit cost of this process is very considerably reduced, since a series of components can be treated simultaneously; and it is for this reason that it is preferable for the nose 4 to be separate from the reaction plate 21 or the plate member 11, as the case may be according to the application concerned.

The central opening may of course be formed in the damper plate 31 of FIG. 1. In that case, the damper plate 31 is extended inwardly by a nose that surrounds the central nose 4, being itself surrounded by the reaction plate 21. This is made possible due to the small thickness of the carbon coating.

It is possible to use the compositions described in European published specification EP 0 393 198A to form the coating, which adheres easily to the appropriate components of the flywheel, and which is highly resistant to the maximum temperatures reached by the flywheel in operation.

What is claimed is:

1. A damped flywheel comprising: a first mass having an axially projecting centring nose, a second mass defining a central opening in the second mass, a torsion damping device arranged operatively between the first and second masses, and mounting means for mounting said first and second masses for relative rotational displacement of one with respect to the other against the action of said torsion damping device with the centring nose penetrating into said central opening, the flywheel further comprising support means interposed operatively between the said nose and central opening for mounting the second mass rotatably on the first mass, wherein said support means comprise a coating of amorphous diamond carbon material.

2. A flywheel according to claim 1, wherein the centring nose has a projecting element of generally V-shaped cross section, the said coating being formed on the said projecting element.

3. A flywheel according to claim 2, further including a bearing ring coaxial with the centring nose, and axially acting resilient means biassing the said bearing ring axially into contact with the said projecting element of the nose.

4. A flywheel according to claim 1 wherein, the centring nose having an outer periphery and the central opening having an inner periphery, the flywheel further includes a bearing ring interposed radially between the said outer periphery of the nose and the inner periphery of the central opening, the said coating being formed on the said interposed bearing ring.

5. A flywheel according to claim 1, further including two rings of L-shaped cross section interposed between the centring nose and the central opening, the said coating being formed on the two rings of L-shaped cross section.

6. A flywheel according to claim 1, wherein the said coating is formed on at least one surface selected from a surface of the centring nose and a surface defining the central opening, whereby to work directly between the nose and the central opening.

7. A flywheel according to claim 6, wherein the centring nose has a radially projecting crown element, the said coating being formed on the latter.

8. A flywheel according to claim 1, wherein the coating has a thickness of 2 to 3 microns.

9. A flywheel according to claim 8, wherein the coating is formed by the "CVD assisted plasma" process.

10. A flywheel according to claim 1, for a vehicle having an internal combustion engine with a crankshaft together with a clutch coupled to the crankshaft and having a reaction plate, the flywheel further including a plate member arranged to be carried on the crankshaft, the said first mass of the flywheel being constituted by the said plate member and the centring nose secured thereto, the second mass of the flywheel being constituted by the reaction plate, the latter having an inner periphery defining the said central opening.

11. A damped flywheel comprising: a first mass having an axially projecting centring nose, a second mass defining a central opening in the second mass, a torsion damping device arranged operatively between the first and second masses, and mounting means for mounting said first and second masses for relative rotational displacement of one with respect to the other against the action of said torsion damping device with the centring nose penetrating into said central opening, the flywheel further comprising support means interposed operatively between the said nose and central opening for mounting the second mass rotatably on the first mass, a first ring fixed on the centring nose and a second ring fixed in the central opening and surrounding and engaging the first ring, so as to define an interface between the two said rings, wherein said support means comprise a coating of amorphous diamond carbon material, said coating being formed in said interface.

12. A flywheel according to claim 11, further including screw fastening means securing the said nose to the said first mass, and a thrust ring of said screw fastening means, the coating being formed on the first ring and on the said thrust ring, the ring having a collar with a face of the collar being directed toward the thrust ring, the coating being extended on to the said face of the collar, so that coating has a generally U-shaped section.

* * * * *